O. Lesley.
Saw-Set.
N° 10,625.   Patented Mar. 14, 1854.
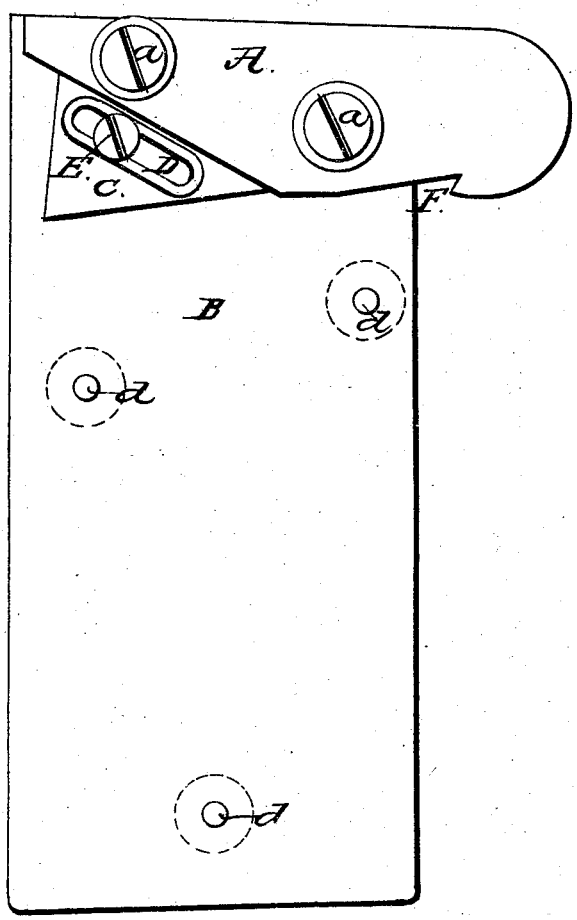

UNITED STATES PATENT OFFICE.

OLIVER LESLEY, OF ATTICA, INDIANA.

IMPROVED SAW-SET.

Specification forming part of Letters Patent No. 10,625, dated March 14, 1854.

*To all whom it may concern:*

Be it known that I, OLIVER LESLEY, of Attica, in the county of Fountain and State of Indiana, have invented a new and useful Implement for Sharpening and Turning the Teeth of Saws; and I do hereby declare that the following is a full, clear, and exact description of the same, reference being had to the accompanying drawings, making a part of this specification.

The nature of my invention consists in the arrangement of a triangular gage admitting of adjustment or movement, in connection with a swage provided with a suitable nick or recess for receiving the tooth of the saw in its process of sharpening and turning, while the gage regulates the turn or hook of the tooth thus operated on, both of these devices being secured on a stock or handle, by which the implement is held when in use.

The importance of this improvement will the more readily be appreciated if it is considered how different the densities of woods are. For instance, the spongy white pine or other soft woods will admit a hook or bend of the tooth and a consequent cut of the chip which would be altogether inapplicable to the sawing of hard wood like white oak, &c., and that this regularity in the teeth should be so it is only necessary to cut with a handsaw in which one or two of the teeth are irregular to fully appreciate the advantages set forth.

In the drawings, representing the implement of its full size, A is a plate of steel of sufficient thickness to admit of spreading within a nick or cavity, F, the end of any saw to which it may be applied. One of its ends is rounded, while the other is angular, so as to admit of a triangular adjustable gage, $c$, being placed under the end thereof. This plate A is secured permanently to a wooden stock or handle, B, by screws $a\ a$. The angular gage $c$ is provided with a slot, D, which admits of its being slid up and down on the screw E when it is loosened from the handle B. $d\ d\ d$ are set-screws in the handle, for the purpose of keeping the thickness of the saw-blade as near the center of the thickness of the plate A, so that the point of the tooth may spread in the recess F.

The implement of the size delineated will admit of application or use to a saw from one and three-fourths inch to one of two and three-fourths inches between the points of the teeth of the saw.

In the use of the implement at the first sharpening of a saw apply the nick or recess F to the point of a tooth; then adjust the angular gage $c$ to the next tooth, giving any angle desired to the hooked end of the tooth in the recess. The set-screw E is to be turned in with a driver, fastening the gage $c$ to the handle. The implement is now ready for use. Now grasp the handle B with the left hand, applying the palm to the back thereof and the thumb and second finger to the sides, the front finger being clasped over the upper end of the implement. It is now applied with the rounded end of A toward the lower end of the mill-saw if in its gate, and with a light hammer in the right hand give it two or three light strokes on the rounded end—say at $x$—as nearly in line with the horizontal line of the cut of the saw-tooth—viz., 2 of the tooth shown in drawings—observing to keep the adjoining tooth in contact with $c$ and the blade firmly against the points of screws $d\ d\ d$.

Before a second sharpening it is best to strike a light blow on the knuckle at the point before applying the sharpener, as it saves the metal of the saw by turning the point of the tooth up, and it is by this process of compressing the point into the recess instead of filing into shape that the advantage lies.

Having described my improvement in saw-sharpeners, what I claim as my invention, and desire to secure by Letters Patent, is—

The arrangement of the triangular gage $c$ with the swage A upon the stock B, for the purpose of adjusting the gage relatively to the nick or recess F in the swage, as set forth in the foregoing specification.

In testimony whereof I have hereunto signed my name before two subscribing witnesses.

OLIVER LESLEY.

Witnesses:
JOHN F. CLARK,
SAML. GRUBB.